United States Patent
Reuschel et al.

(10) Patent No.: US 10,788,105 B2
(45) Date of Patent: Sep. 29, 2020

(54) PENDULUM TENSIONER HAVING ADJUSTABLE AXIAL PLAY AND BELT DRIVE

(71) Applicant: SCHAEFFLER TECHNOLOGIES AG & CO. KG, Herzogenaurach (DE)

(72) Inventors: Sascha Reuschel, Hersbruck (DE); Luc Fischer, Reinhardsmunster (FR); Thierry Leobold, Woerth (FR); Thomas Motz, Herzogenaurach (DE); Marco Meisborn, Hoechstadt a.d. Aisch (DE); Robert Kamm, Fuerth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 380 days.

(21) Appl. No.: 15/743,171

(22) PCT Filed: Jul. 1, 2016

(86) PCT No.: PCT/DE2016/200302
§ 371 (c)(1),
(2) Date: Jan. 9, 2018

(87) PCT Pub. No.: WO2017/008798
PCT Pub. Date: Jan. 19, 2017

(65) Prior Publication Data
US 2018/0202521 A1 Jul. 19, 2018

(30) Foreign Application Priority Data
Jul. 10, 2015 (DE) .................. 10 2015 212 927

(51) Int. Cl.
*F16K 7/12* (2006.01)
*F02B 67/06* (2006.01)
(Continued)

(52) U.S. Cl.
CPC .......... *F16H 7/1281* (2013.01); *F02B 67/06* (2013.01); *F16H 7/1218* (2013.01);
(Continued)

(58) Field of Classification Search
CPC ................ F16H 7/1218; F16H 7/1281; F16H 2007/0806; F16H 2007/0865;
(Continued)

(56) References Cited

U.S. PATENT DOCUMENTS 8,821,328 B2   9/2014  Jud et al.
9,097,314 B2 * 8/2015  Wolf ..................... F16H 7/1281
(Continued)

FOREIGN PATENT DOCUMENTS

| DE | 8527499 U1 | 5/1988 |
| DE | 102011084680 B3 | 11/2012 |
| DE | 102012209028 A1 | 12/2013 |
| EP | 2128489 A2 | 12/2009 |
| EP | 2557295 A2 | 2/2013 |

OTHER PUBLICATIONS

International Search Report for Application No. PCT/DE2016/200302, dated Oct. 20, 2016, 5 Pages.

*Primary Examiner* — Michael R Mansen
*Assistant Examiner* — Robert T Reese
(74) *Attorney, Agent, or Firm* — Brooks Kushman P.C.

(57) ABSTRACT

A pendulum tensioner, comprising a first and second tensioning arm, and a bearing sleeve configured to attach to a generator housing, wherein the bearing sleeve forms a sliding channel together with a locking sleeve, in which one of the tensioning arms is rotatably positioned with axial play.

18 Claims, 12 Drawing Sheets

(51) Int. Cl.
*F16H 7/12* (2006.01)
*F16H 7/08* (2006.01)

(52) U.S. Cl.
CPC ............... *F16H 2007/0806* (2013.01); *F16H 2007/0865* (2013.01); *F16H 2007/0874* (2013.01); *F16H 2007/0893* (2013.01); *F16H 2007/0897* (2013.01)

(58) Field of Classification Search
CPC ..... F16H 2007/0874; F16H 2007/0893; F16H 2007/0897; F02B 67/00–10; F16C 17/02; F16C 17/10; F16C 17/107; F16C 23/02; F16C 25/04; F16C 43/02; F16C 2240/46
See application file for complete search history.

(56) References Cited

U.S. PATENT DOCUMENTS

| | | | |
|---|---|---|---|
| 9,182,015 B2 * | 11/2015 | Mack | F16H 7/1281 |
| 9,709,137 B2 * | 7/2017 | Walter | F16H 7/0831 |
| 2013/0040770 A1 * | 2/2013 | Wolf | F16H 7/1281 |
| | | | 474/134 |
| 2014/0342862 A1 * | 11/2014 | Wolf | F02B 67/06 |
| | | | 474/117 |
| 2015/0362047 A1 * | 12/2015 | Barillet | F16H 7/1281 |
| | | | 474/135 |
| 2018/0163788 A1 * | 6/2018 | Dell | F02B 67/06 |
| 2018/0298995 A1 * | 10/2018 | Reuschel | F02B 67/06 |

* cited by examiner

PENDULUM TENSIONER HAVING ADJUSTABLE AXIAL PLAY AND BELT DRIVE

CROSS-REFERENCE TO RELATED APPLICATIONS

This application is the U.S. National Phase of PCT/DE2016/200302 filed Jul. 1, 2016, which claims priority to DE 102015212927.6 filed Jul. 10, 2015, the entire disclosures of which are incorporated by reference herein.

TECHNICAL FIELD

The disclosure relates to a pendulum tensioner for an auxiliary flexible drive of an internal combustion engine which is configured to at least partially surround a generator shaft, and which has securing regions on two tensioning arms that are arranged rotationally to one another for two tensioning rollers, by use of a flexible drive, such as a belt, of the auxiliary flexible drive can be tensioned. The pendulum tensioner comprises a bearing sleeve for the attaching to a generator housing, wherein the bearing sleeve forms a sliding channel together with a locking sleeve that is adjacent and may be connected via an interference fit assembly, such as e.g. for a component that is attached to the tensioning arm or a tensioning arm section, wherein the locking sleeve features a locking wall that extends in radial direction, which defines an axial limit of the sliding channel, wherein at least one of the tensioning arms engages within the sliding channel in a rotatable manner, with radial and axial play.

BACKGROUND

A proximate prior art is known from the European patent specification EP 2 128 489 B1. It refers to a belt tensioning apparatus for starter and generator applications. A belt tensioning apparatus for a belt drive is disclosed in this patent specification, which comprises a drive engine with a drive belt pulley, which can be actuated around a drive shaft, and several further belt pulleys.

The European patent specification EP 2 557 295 B1 discloses a tensioning apparatus for a belt drive and an electric machine with such a tensioning apparatus. The apparatus that is disclosed in it refers to a tensioning apparatus for a belt drive, which comprises a continuously turning belt, an electric machine with a machine housing and a drive wheel and at least one further drive wheel, which is set in a drive connection to the other drive wheel via the belt. The German utility model DE 85 27 499 U1 is furthermore known. It relates to an apparatus for the adjusting of the axial play between the rotor and the stator of an electric motor. It is thus the task of the apparatus that is disclosed in it, to present an arrangement that allows for an adjusting of the axial play in a particularly simple manner and with minimal effort.

Thus, several pendulum tensioners in different design forms are already known from the prior art. Another apparatus is known, which entails a most simple way for the adjusting of the axial play.

So far, it was common that the adjusting of the play, for example the axial play in components, was carried out with the addition of the play of the corresponding components. It is hereby referred to a corresponding pairing (Zupaarung). One the one hand, this corresponding pairing of components that are relevant for the axial play requires the production of several individual components according to a corresponding dimension, on the other hand, at least one of the relevant components should serve as a compensating element. In a metal-cutting production, this calls for various adjusting dimensions. In a non-cutting production, there is even a necessity to use various tools.

For apparatuses that are known from the prior art, it is furthermore necessary that the relevant components, which are needed for the adjusting of the axial play during the assembly, have to be measured in their composite assembly, and the suitable and highly accurate adjustment component is to arranged for each actual measurement. This adjusting of the axial play by using a corresponding pairing thus requires increased manufacturing and/or tool costs, increased storage costs that result from the need to have these compensation elements available and for keeping them separate, as well as increased assembly costs due to the measuring of the actual dimensions and due to having to ensure that wrong pairings will be avoided. A varying precision or the downgrading of the compensation elements furthermore leads to a certain variation in the axial play after the assembly.

The disadvantages of the prior art that were disclosed in these printed publications are that high-precision manufacturing tolerances have to be fulfilled during the production and the assembly of a pendulum tensioner/tensioning apparatus, in order to achieve the axial play that is desired in its total sum. The possibilities that are presented in the prior art for the adjusting of an axial play, are in no way sufficient, so that they could be transferred to the application field of the pendulum tensioner. Thus, no solution is known, which discloses an economical and at the same time high-precision adjusting of the axial play of a pendulum tensioner.

SUMMARY

It is therefore the objective of the present disclosure to correct the disadvantages of the prior art, and to particularly disclose a pendulum tensioner, that no longer has to fulfill the highest demands with regard to manufacturing tolerances, in order to still achieve a precise axial play that is made up of the addition of several tolerance dimensions, and which functions precisely and for a long time.

This is accomplished in accordance with the disclosure in that the axial play is adjusted by using the axial sleeve distance between the locking sleeve and the bearing sleeve, wherein the sleeve distance is greater than the axial play, or in a borderline case, equal to it. This arrangement allows that the axial play can be adjusted by using a relative motion of the locking sleeve and/or of the bearing sleeve in axial direction. It is thus possible that different adjusting dimensions, which result during a metal-cutting production of the individual components of the pendulum tensioner, or even different tools, which would be required for a non-cutting manufacturing, can be avoided. This may reduce the complexity of the assembly, increases the efficiency in the production and reduces the time that is necessary for a ready-to-use assembly of the components.

Advantageous embodiments are asserted in the subclaims and are explained in more detail in the following.

It is thus advantageous if an interference fit assembly between the bearing sleeve and the locking sleeve is realized via a contact surface that extends in axial direction. The fact that this contact surface between the locking sleeve and the bearing sleeve extends sufficiently long/far in axial direction, has the effect that the interference fit assembly fulfills the high demands that are placed on it in terms of sturdiness and power transmission. This extending in axial direction furthermore includes the advantage, that the pendulum tensioner is very compact in terms of its radially required space.

If the axial play can be varied/adjusted by an axial motion of the bearing sleeve and/or of the locking sleeve, the effect is on the one hand, that incorrect pairings, which result from manufacturing tolerances, can be avoided, and on the other hand that the axial play can be adjusted with high accuracy without any significant effort. This arrangement further allows that the sections of the locking sleeve and/or of the bearing sleeve, which extend in axial direction, can be optimally customized to the requirements that are issued onto the interference fit assembly with regard to their material and their surface properties. Those surfaces can also be designed in such a way that they result in a setting of the axial play that is associated with little effort.

Another advantageous embodiment in found in that the interference fit assembly is designed in such a way, that the locking sleeve is arranged radially within the bearing sleeve or that the locking sleeve is arranged radially outside of the bearing sleeve. Thus, two embodiments with regard to the radial arrangement of the locking sleeve and of the bearing sleeve are possible, which both comply with the requirements to provide a reliable interference fit assembly. In addition to a high reliability, this entails the advantage of an increased flexibility. The apparatus according to the disclosure is thus not limited to one arrangement, but makes it possible to carry out a corresponding arrangement of the locking sleeve and of the bearing sleeve, depending on the application.

As soon as a bearing made up of two bearing components, such as bearing rings, is arranged within the sliding channel, which is prepared to allow for a relative rotation between one of the tensioning arms and the sliding channel, so that the tensioning arm is mounted in such a way that it is rotatable, opens up further positive aspects. Since the bearing of the tensioning arm, which makes its low-friction relative motion possible, is arranged within the sliding channel that is formed by the locking sleeve and the bearing sleeve, the compact design of the apparatus according to the disclosure is increased and the required construction space of the pendulum tensioner according to the disclosure is thus kept as low as possible. Furthermore, the force that results from the bearing of the tensioning arm, which is issuing in circumferential direction in a distributed manner, does not have a negative effect on the interference fit assembly between the locking sleeve and the bearing sleeve. Rather, the bearing that is arranged within the sliding channel assists so that possible tensions are distributed in circumferential direction. This results in dynamic advantages for the pendulum tensioner according to the disclosure.

Another advantageous embodiment is characterized in that the one bearing is designed as an axial bearing and the other bearing as a combined axial and radial bearing. This combination allows to absorb and to compensate forces in axial direction, as well as in radial direction. Since high axial forces act on this bearing, both bearing components realize an axial bearing. This increases the operational smoothness of the pendulum tensioner according to the disclosure and reduces the friction that is occurring in it.

A further advantageous embodiment is realized in that the axial bearing and/or the axial and radial bearing is/are designed as a sliding bearing. By using an appropriately selected, low-friction material pairing and/or by using lubrication, a minimum resistance of the components, which are moving in relation to each other, can be achieved. Sliding bearings are furthermore able to realize advantages in connection with construction space on the one hand, and also with regard to costs when compared to rolling bearings. Sliding bearings also make it possible that the pendulum tensioner according to the disclosure fulfills the highest requirements in relation to an economic background.

A further advantageous embodiment is characterized in that the bearing sleeve is directly connected to the generator housing, e.g. via a flange section or via a separate connecting flange. This entails a connection of the pendulum tensioner according to the disclosure into a drive unit, that can be implemented in a simple way. Such a connection furthermore makes it possible that the pendulum tensioner according to the disclosure can be integrated into existing systems without any additional effort. Thus, the implementation of the apparatus according to the disclosure is not associated with high investment costs for the entire drive unit.

If the bearing sleeve comprises a plurality of asymmetrically arranged mounting sections, which are suitable for/prepared to connect the pendulum tensioner to a generator and/or to a generator housing, this has the effect that the mounting sections can be arranged in accordance with the construction space that is available during operation. The shape of the bearing sleeve is thus not rigidly fixed, which makes it possible that the pendulum tensioner can be integrated into various alignments, since the mounting sections of the bearing sleeve can always be adapted to the changing conditions.

The apparatus according to the disclosure furthermore refers to a belt drive of a motor vehicle, with a generator that comprises a generator housing, in which a generator shaft is arranged in a rotatable manner, as well as with a belt that is connected in a torque-transmitting manner to the generator shaft, wherein the belt drive features a pendulum tensioner according to the disclosure.

In other words, it can be said that the apparatus according to the disclosure discloses a concept for the construction/assembly of a two-sleeved interference fit assembly for the adjusting of the axial play. The apparatus in accordance with the disclosure relates to a pendulum tensioner/decoupling tensioner, which is intended for auxiliary flexible drives, but which can also be used for other general tensioning types, which place corresponding demands on the axial play.

The presented disclosure concept of the two-sleeved interference fit assembly between the bearing and the locking sleeve enormously reduces the effort when compared to the adjusting of the axial play by using a corresponding pairing. It is thus not necessary to produce, retain and store various adjusting components, nor is it necessary to slow down and/or increase the price of the assembly procedure by using the measuring of the actual dimensions and the corresponding pairing. The variation of the desired axial play of the apparatus that was disclosed in connection with this application is furthermore within the range of precision of a press, which carries out this adjusting. In such a press, travel paths are possible within the range of micrometers, whereby the variation of the axial play is significantly lower than with reasonable production and storage efforts by apparatuses from the prior art.

Another aspect can be found in that the individual components of the apparatus according to the disclosure can be manufactured with a high tolerance, due to which they are more economical in production. This is made possible because the tolerances of all affected components can be completely eliminated during the assembly. The variation of the axial play of various mounted pendulum tensioners is therefore minimal. The reason for this is found in that the axial play for the two-sleeved interference fit assembly according to the disclosure is one complete adjusting dimension at one mounting tool, and not the result of a chain of tolerances. This prevents problems, that can arise during operation, such as e.g. a jamming at the motor. Furthermore, this apparatus according to the disclosure makes it possible to quickly and easily respond to requirements of the customers. It is thus possible to implement batch-related changes in a simple manner without having to deviate from a uniform strategy.

It can thus be said in other words, that the disclosure allows for a certain play, usually an axial play, of the pendulum tensioner without increasing the measurement effort during the assembly, while permitting the existence of higher tolerances and smaller variations. This is realized by using two steel and/or aluminum sleeves with possibly one flange, in particular a bearing sleeve and a locking sleeve. The bearing sleeve and the locking sleeve are connected by using an interference fit assembly and/or an additional form closure.

The axial play is adjusted during the assembly of the pendulum tensioner by pressing the two sleeves and of the components that are arranged between them in the sliding channel up to the limit stop, or up to the point, where the axial play amounts to zero. In such a case it is referred to a pressing "to block". Afterwards, one of the two sleeves will be pushed back by the amount of the desired axial play.

Since the axial play has a direct effect on the tilting of the pendulum tensioner, which is tolerated very narrowly especially at the pendulum rollers, an exact adjusting of the axial play with a low tolerance as well as low variation between the assembled pendulum tensioners is of highest importance due to reasons of functionality.

The adjusted axial play generally reaches values that range between 0.1 mm and 0.3 mm, for example 0.2 mm. By using the apparatus according to the disclosure, it is possible to avoid the use of compensating discs, which are supposed to produce such an axial play.

The bearing sleeve and the locking sleeve may be referring to thin-walled and coated sheet metal components. By using the coating, it is possible to reduce or to avoid slip-stick effects, which would otherwise lead to an excessive inaccuracy of the axial play, that is to be adjusted, when the two sleeves are pushed apart from the compressed block position. The resulting interference fit assembly is furthermore designed in such a way, that it meets the high demands which are placed on it with regards to its fatigue strength.

Before the bearing sleeve and the locking sleeve enter the interference fit, the locking sleeve is inserted from the side/from the radial side into the remaining components of the pendulum tensioner before it is axially reduced. This procedure for the assembly of the two sleeves may be necessary, since as a cover of the tensioning arm comprises such mounting sections, so that a purely axial mounting is not possible. This means that the locking sleeve is pushed in from the side, and this is carried out before the hearing sleeve and the locking sleeve are pressed together.

BRIEF DESCRIPTION OF THE DRAWINGS

The disclosure will be described in more detail with reference to the figures in the following.

It is shown.

The figures are at times only of schematic nature and exclusive serve for the sake of understanding the disclosure. Identical elements are given the same reference signs. The individual characteristics of the embodiments may be exchanged with each other.

DETAILED DESCRIPTION

Figure 1:
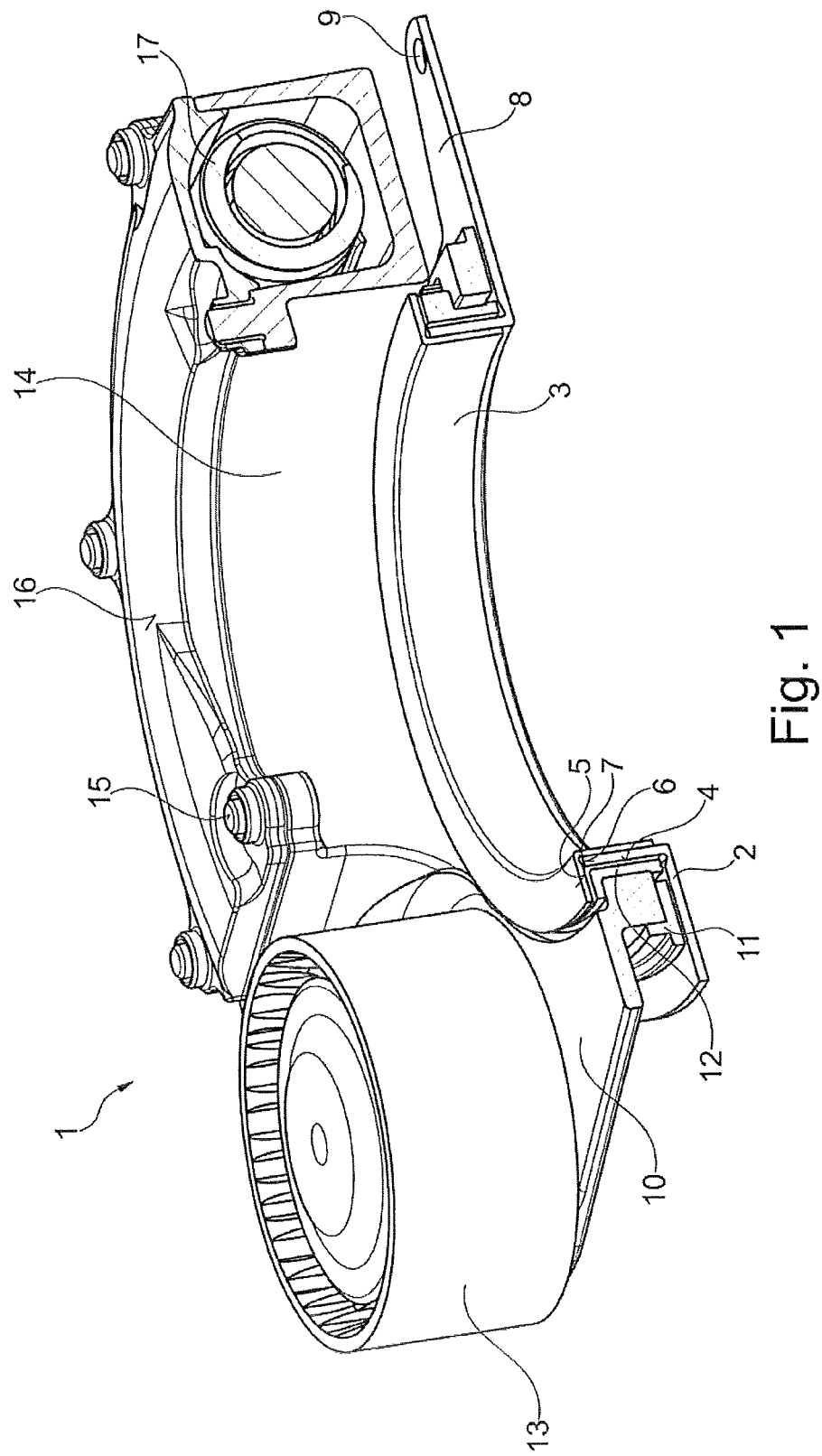
FIG. 1 a perspective view of the pendulum tensioner according to the disclosure in longitudinal section.

In FIG. 1, a perspective view of a pendulum tensioner 1 according to the disclosure of an auxiliary unit belt drive of a combustion engine or an internal combustion engine is depicted. The pendulum tensioner 1 is attached to a not depicted starter generator and is mounted in such a way that it is rotatable around a generator shaft. For the sake of mounting, pendulum tensioner 1 comprises a bearing sleeve 2 and a locking sleeve 3, which are fitted together by an interference fit assembly. In the presented embodiment, locking sleeve 3 is pressed into bearing sleeve 2 on the radial inner side.

Together, bearing sleeve 2 and locking sleeve 3 define sliding channel 4, which is pointing radially toward the outside. Locking sleeve 3 features a locking wall 5, which is extending in radial direction, facing towards the sliding channel. This locking wall 5 provides a contacting surface for assembling 32 for an axial/radial bearing 12 during the assembly.

Figure 2:
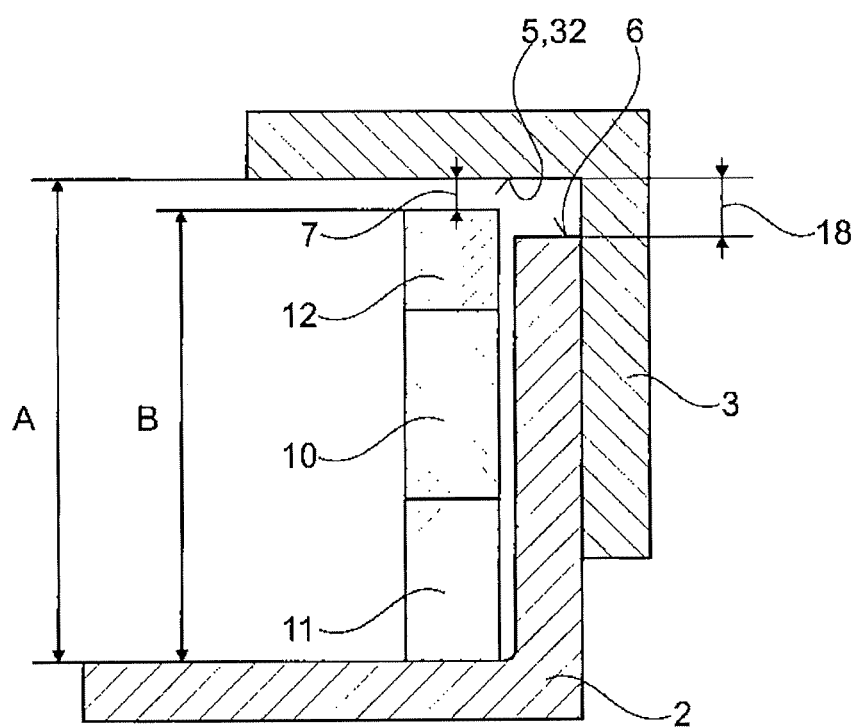
FIG. 2 a schematic detailed view of the interference fit assembly according to the disclosure.

FIG. 2 illustrates the components within sliding channel 4 in a schematic way. Axial play 7 of a tensioning arm 10 in sliding channel 4 is the measurement deviation "A-B". "A" is hereby the height of sliding channel 4 and "B" is the overall thickness of 3 components, in particular a tensioning arm 10, an axial bearing 11 and the axial/radial bearing 12. The height as well as the thickness are measured in the same direction, which is parallel to the longitudinal axis of the apparatus or parallel to a rotation axis around which tensioning arm 10 is mounted in a rotatable manner.

A front face 6 of bearing sleeve 2 also extends in radial direction, but it is generally smaller/shorter than locking wall 5. In a borderline case, an axial distance between locking wall 5 and front face 6 is equal to the axial play 7 of tensioning arm 10 in sliding channel 4. This axial play 7 can be adjusted by using an axial relative motion of bearing sleeve 2 towards locking sleeve 3.

It is thus a significant innovation that the three components, which are placed within sliding channel 4 during the assembly, which is the tensioning arm 10, the axial bearing 11 and the axial/radial bearing 12, are assembled in such a way by using the pressing together of bearing sleeve 2 and locking sleeve 3, that no axial play 7 is left. The axial play 7 is thus set "to zero". Bearing sleeve 2, tensioning arm 10, axial bearing 11 and the axial/radial bearing 12 and locking sleeve 3 are thus pressed "to block". During the assembly, bearing sleeve 2 and locking sleeve 3 rest against the composite that is made up of the components tensioning arm 10, axial bearing 11 and axial/radial bearing 12, in particular at the upper and lower side of the composite. Yet, in the general course of assembling, which is different from a borderline case, as well as during operation, there is a gap between bearing sleeve 2 and locking sleeve 3. This gap is illustrated in FIG. 2 as sleeves gab 18. Theoretically, sleeves gap 18 can be reduced to zero during assembly when accepting a double fit.

After pressing to block, bearing sleeve 2 is actively and systematically moved away/removed from locking sleeve 3 in a further step of the assembly, so that the desired axial play 7 is adjusted exactly and in the intended way.

The embodiment that is depicted in FIG. 1 furthermore features flange sections 8, that are integrated into bearing sleeve 2. These flange sections 8 can be connected to a component that is adjacent to pendulum tensioner 1 by using a flange hole 9.

In the present example, tensioning arm 10 features a section, that is arranged within sliding channel 4. The mounting of tensioning arm 10 is accomplished via an axial bearing 11 and an axial/radial bearing 12. A tensioning roller 13 is hereby carried by tensioning arm 10.

A portion of tensioning arm 10 is designed in such a way, that it represents a housing 14. This housing 14 is provided with a cover 16 by using a rivet connection 15. Cover 16 thus ensures that housing 14 is tightly sealed.

FIG. 2 depicts a detailed view of the interference fit assembly. Locking sleeve 3 is hereby arranged on the radial inside of bearing sleeve 2. Since the main focus in FIG. 2 is to illustrate the axial play 7 of tensioning arm 10 within sliding channel 4, the components bearing sleeve 2, locking sleeve 3, tensioning arm 10, as well as the two bearings axial bearings 11 and axial/radial bearing 12, that are depicted in it, are only represented in a schematic way. As shown by this detailed view, the interplay of front face 6 and locking wall 5 becomes apparent.

During the adjusting of the apparatus, everything is compressed until block height "B". Measurement 18 is hereby at least or in the borderline case zero.

It can be seen from the depiction in FIG. 2, that the setting of the axial play 7 can be adjusted by using a relative motion of bearing sleeve 2 towards locking sleeve 3. The abovementioned gap between locking wall 5 and front face 6 is defined as sleeves gap 18. In axial direction, this sleeves gap 18 is never smaller than the axial play 7.

Figure 3:
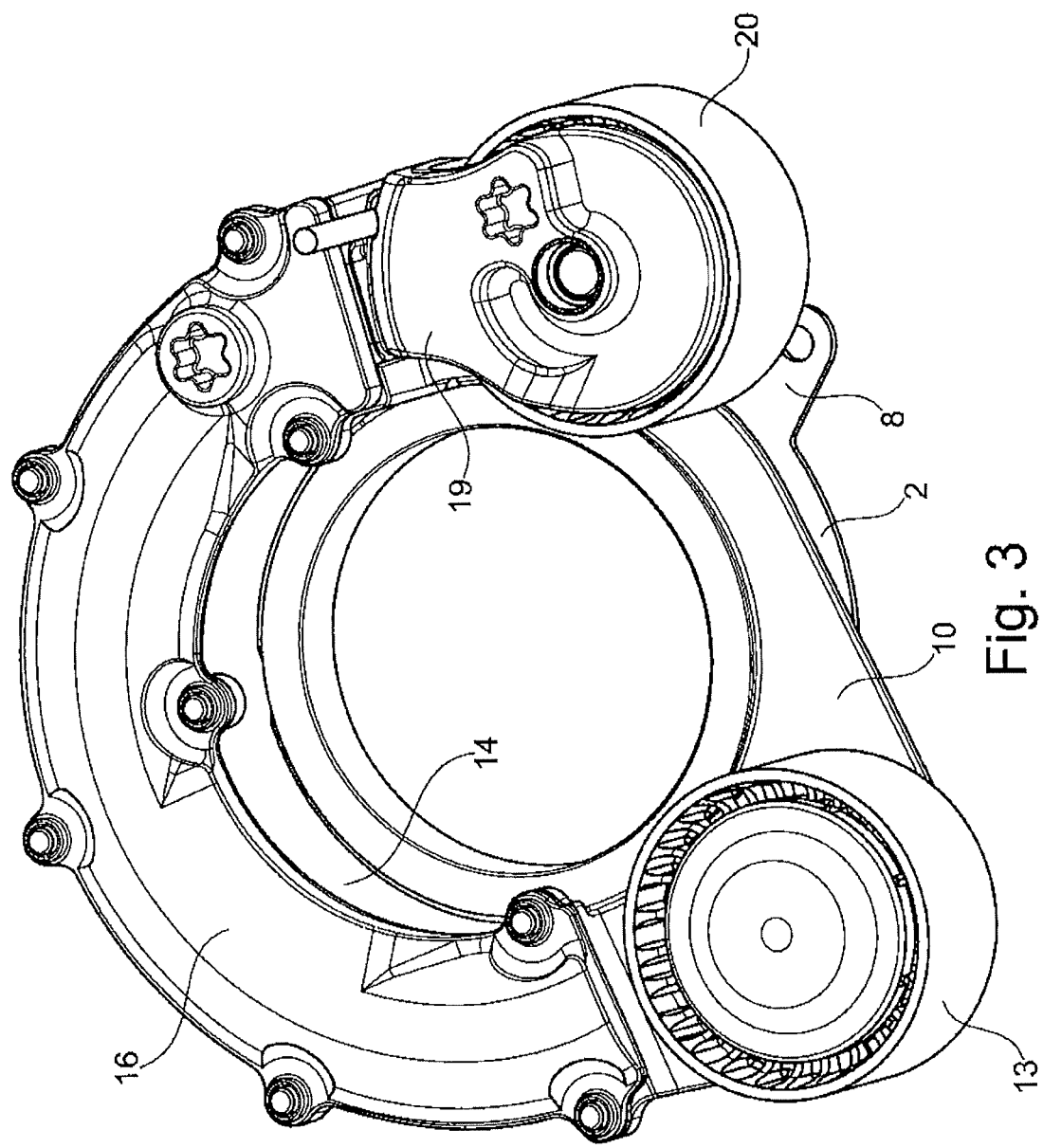
FIG. 3 a perspective view of the pendulum tensioner according to the disclosure with a cover.

In FIG. 3, a perspective view of a pendulum tensioner 1 according to the disclosure is depicted. In addition to tensioning roller 13, which is known from FIG. 1, a second tensioning roller 20, which is mounted on a second tensioning arm 19, is also used. A bow spring 17 produces the belt pre-stressing for pendulum tensioner 1.

Figure 4:
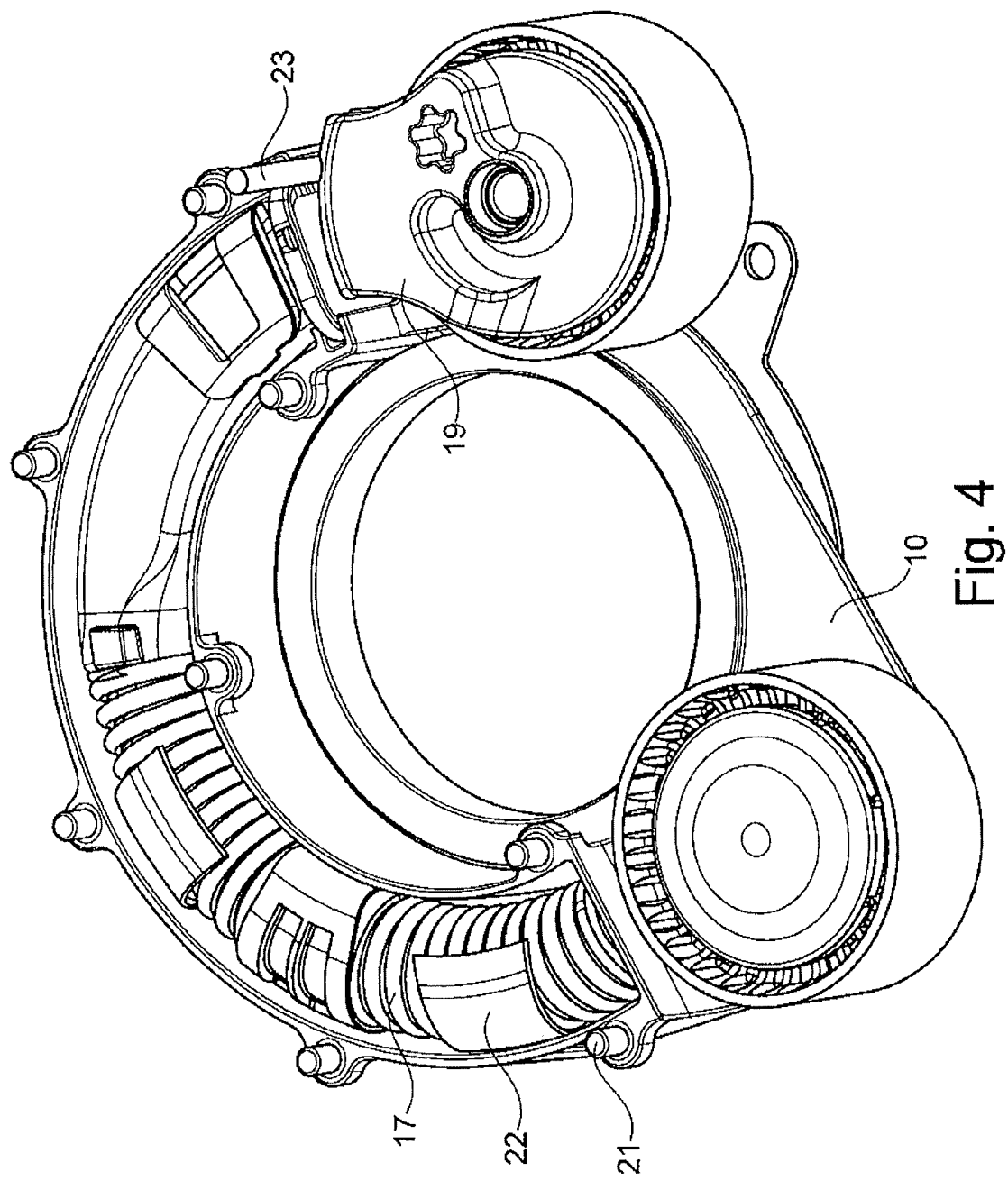
FIG. 4 a perspective view of the pendulum tensioner according to the disclosure without the cover.

The bow spring 17 is visible as shown in the depiction in FIG. 4. Connecting pins 21 are furthermore visible in this representation, which allow for the rivet connection 15 together with cover 16. For an appropriate mounting of bow spring 17, bearing shells 22 are formed, which are made of polyamide in an L-shape. FIG. 4 furthermore illustrates a locking pin 23. It extends in axial direction.

Figure 5:
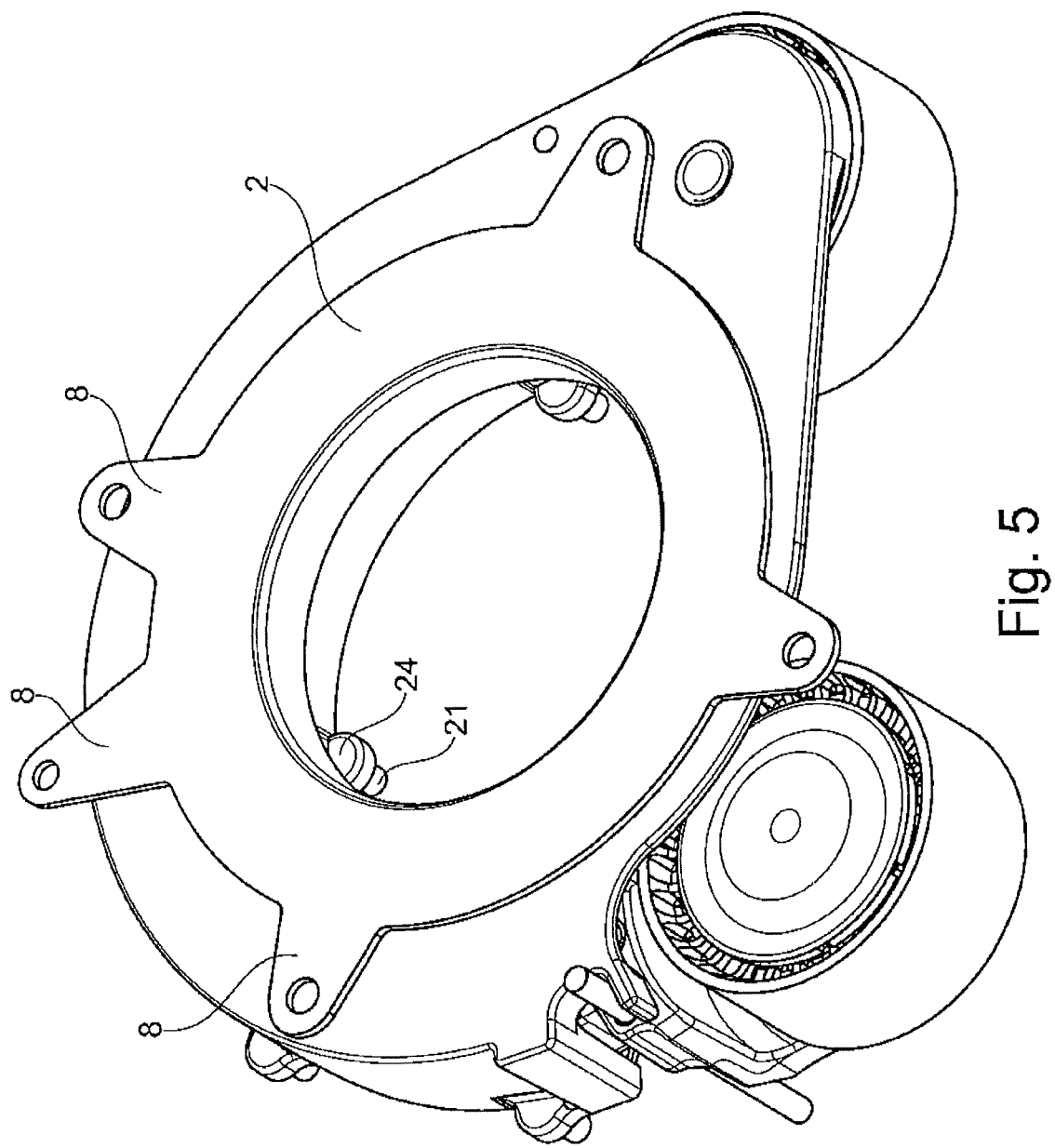
FIG. 5 a perspective view of the pendulum tensioner according to the disclosure from the opposite direction to that of FIG. 4.

In FIG. 5, pendulum tensioner according to the disclosure is depicted from a different perspective. This depiction makes it possible to get a better view of bearing sleeve 2. The asymmetrically arranged flange sections 8 of bearing sleeve 2 feature a different height in radial direction. This is dependent on the respective position at which the pendulum tensioner is mounted to the adjacent component, such as to a generator. The depiction in FIG. 5 furthermore makes it possible to illustrate a pin mounting bracket 24. It represents the arrangement for the mounting of the connecting pins 21. It extends radially inward.

Figure 6:
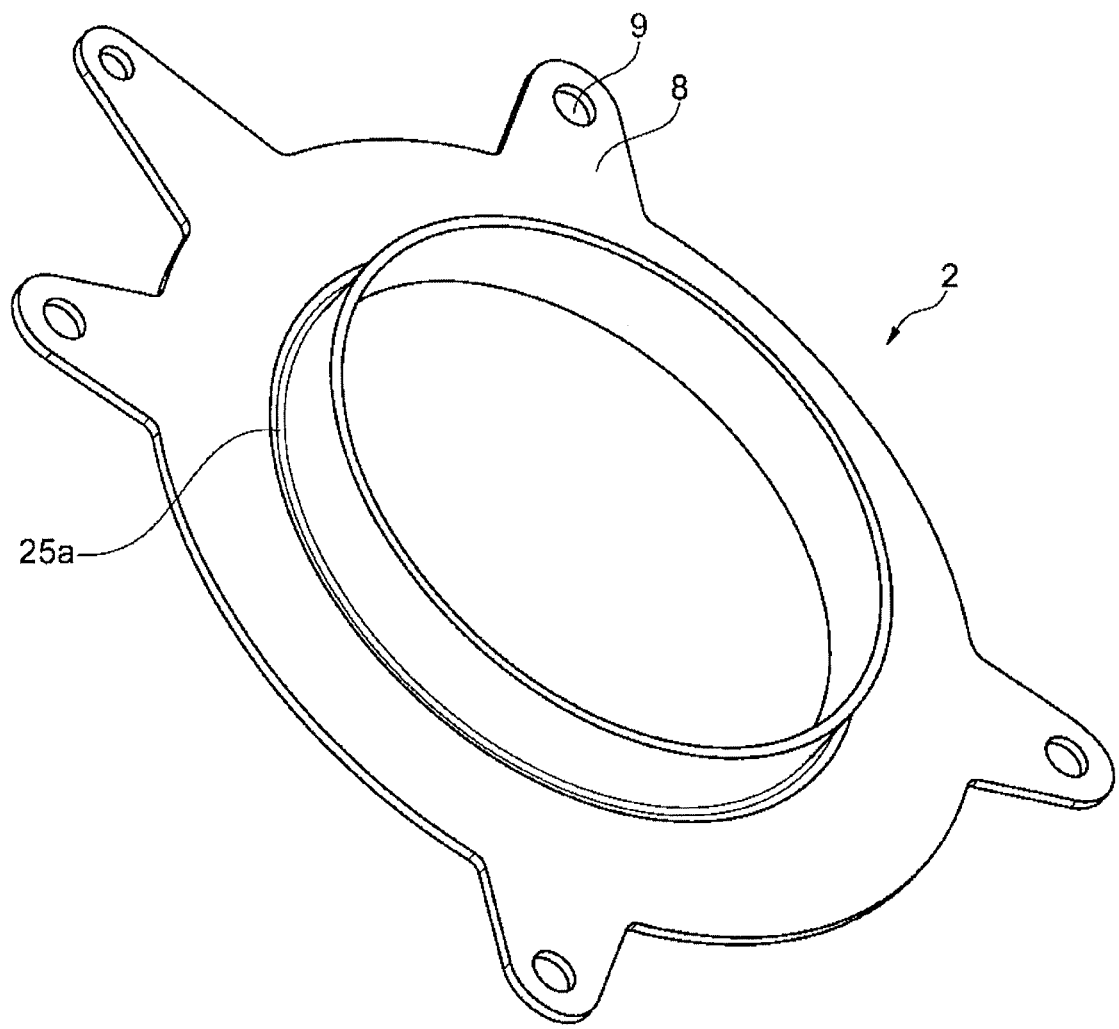
FIG. 6 a perspective view of a bearing sleeve according to the disclosure.

FIG. 6 depicts a perspective view of bearing sleeve 2. In addition to the already known version of the flange sections 8 with the flange holes 9, FIG. 6 depicts a relief groove 25*a*. This relief groove 25*a* allows for an optimal resting of the axial and radial bearing 12 on bearing sleeve 2.

Figure 7:
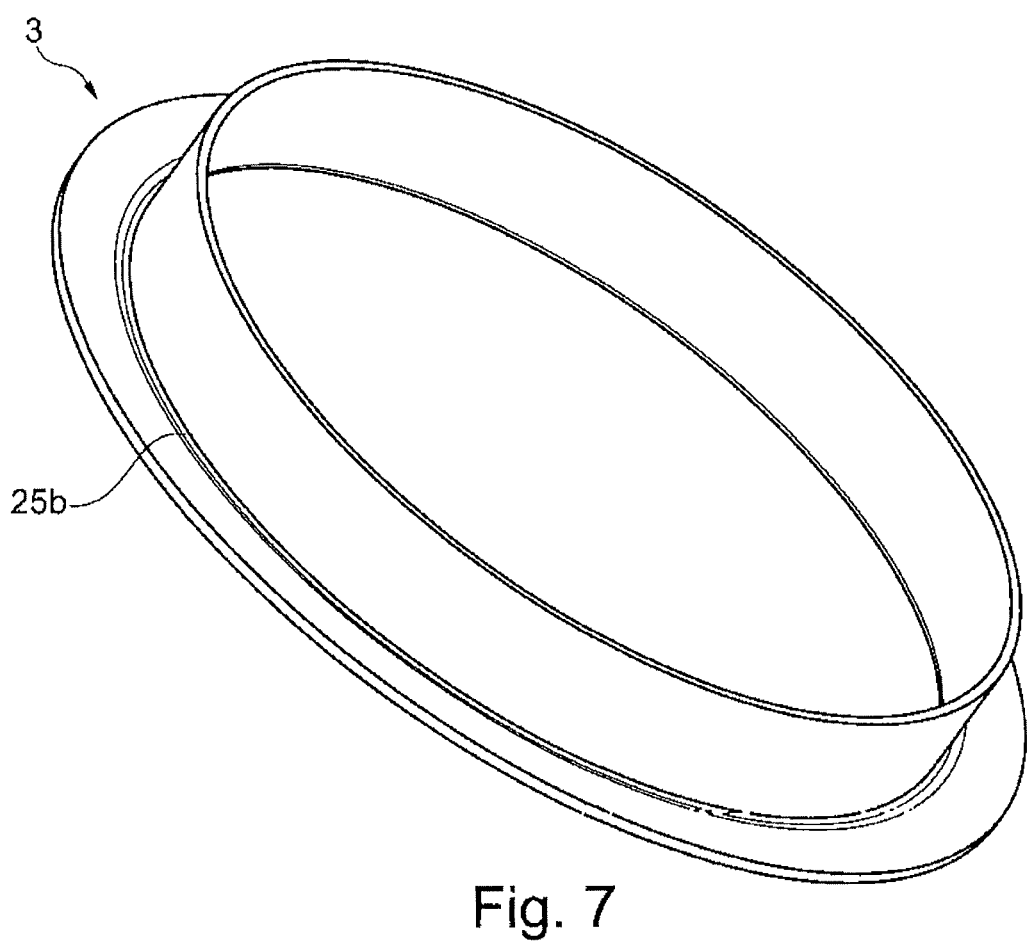
FIG. 7 a perspective view of a locking sleeve according to the disclosure.

FIG. 7 illustrates locking sleeve 3 with a locking sleeve relief groove 25*b*.

Figure 8:
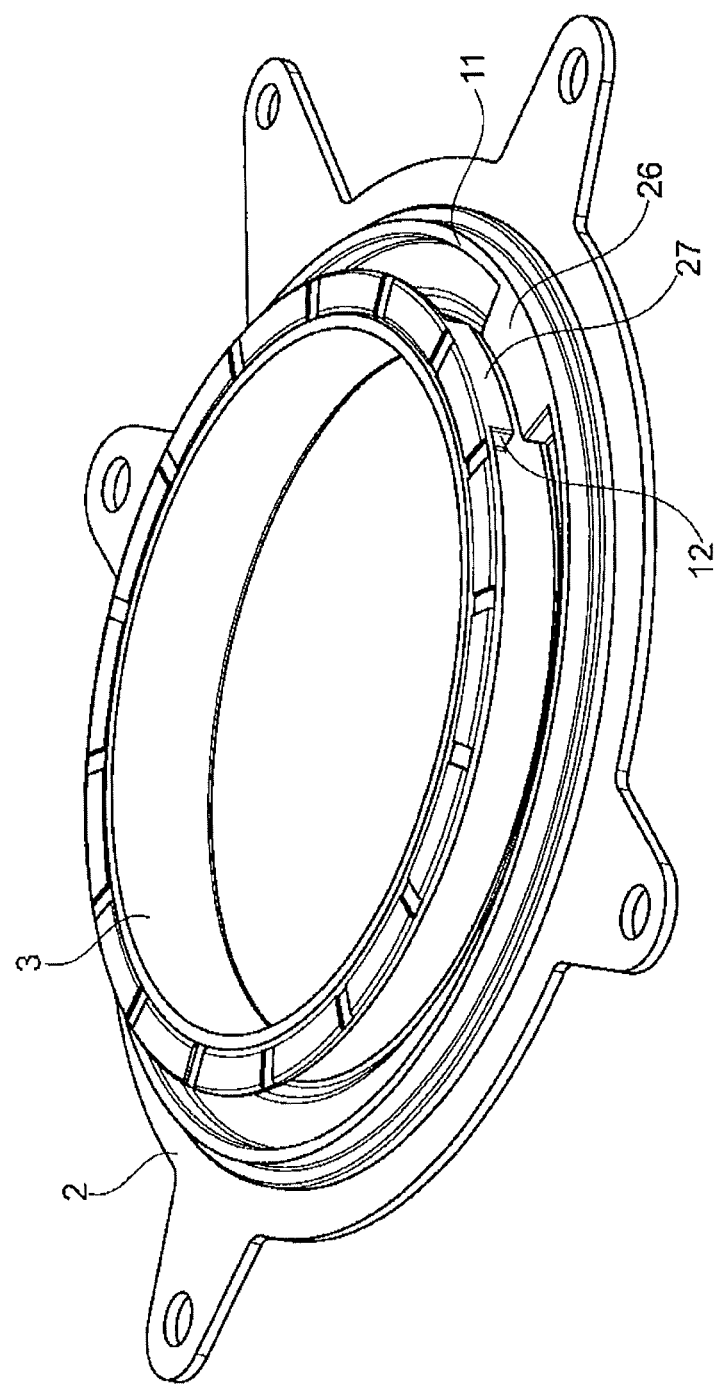
FIG. 8 a perspective view of a partial cross-section representing the locking sleeve, the bearing sleeve, as well as a bearing.

FIG. 8 depicts a partial cross-section through several components of the pendulum tensioner according to the disclosure. Locking sleeve 3 is thus arranged on the radial inside of bearing sleeve 2. The depiction in FIG. 8 furthermore reveals how axial bearing 11 and axial and radial bearing 12 are arranged. Axial bearing 11 is thus securely fixed in circumferential direction by using a axial bearing fixation 26, while the axial and radial bearing 12 is securely fixed by using an axial and radial bearing fixation 27. By means of an interlocking, this axial bearing fixation 26 and the axial and radial bearing fixation 27 make it possible, that axial bearing 11 and the axial and radial bearing 12 are fixed/or can be fixed in circumferential direction. FIG. 8 is a partial cross-section, since locking sleeve 3 is cut off. This allows for a representation of the front face of the axial and radial bearing 12. This front face, which is equipped with grooves in radial direction in the depicted embodiment, is coated with Teflon so that the axial and radial bearing 12, which is made of polyamide, can be supplied with ideal mounting characteristics.

Figure 9:
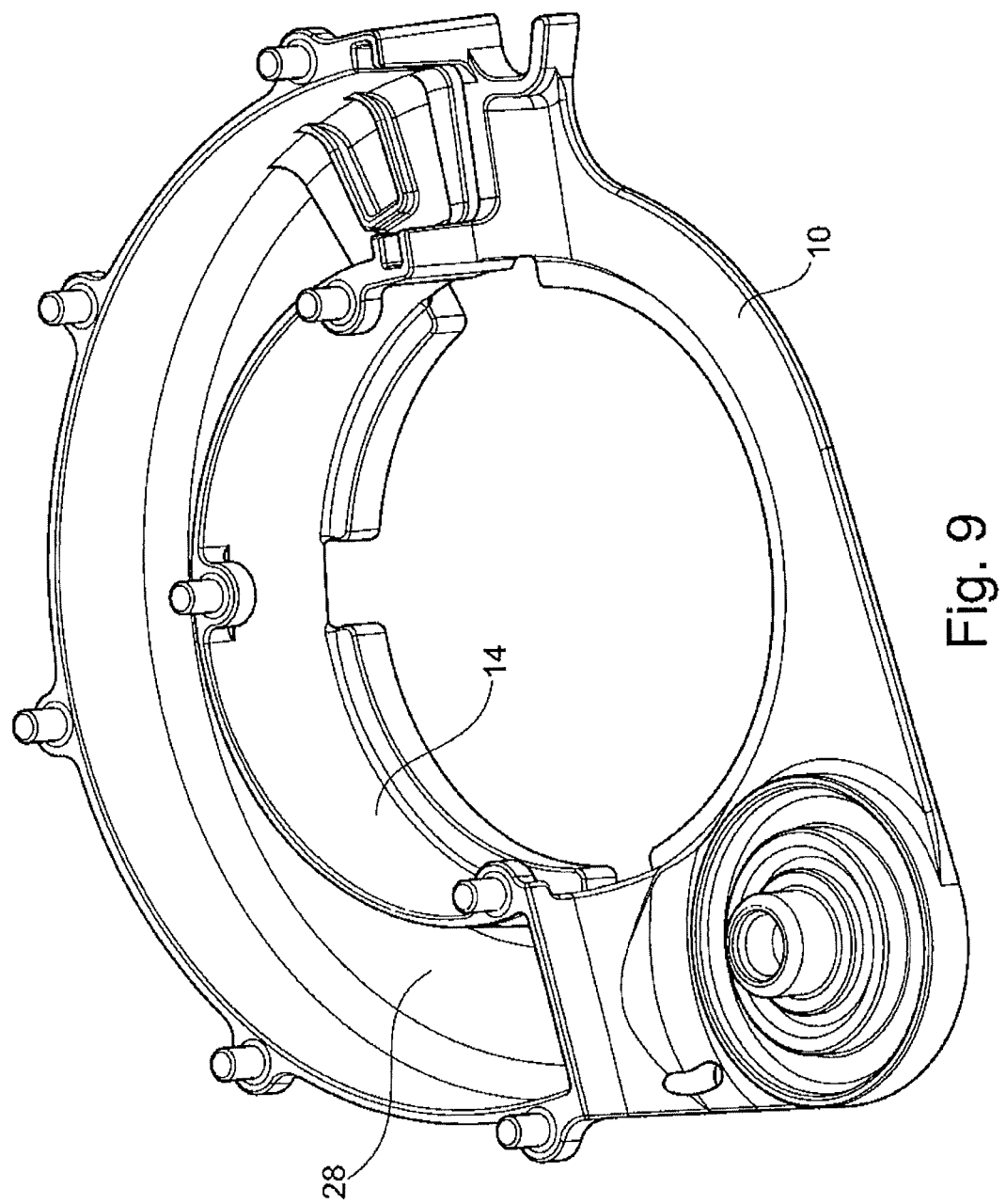
FIG. 9: a perspective view of the tensioning arm according to the disclosure.

Since no bow spring 17 is depicted in FIG. 9, the accommodating channel 28 is visible. It is suitable to accommodate bow spring 17 in such a way, that tensioning arm 10 can be twisted in relation to the second tensioning arm 19. Accommodating channel 28 is formed by housing 14, which is part of tensioning arm 10.

Figure 10:
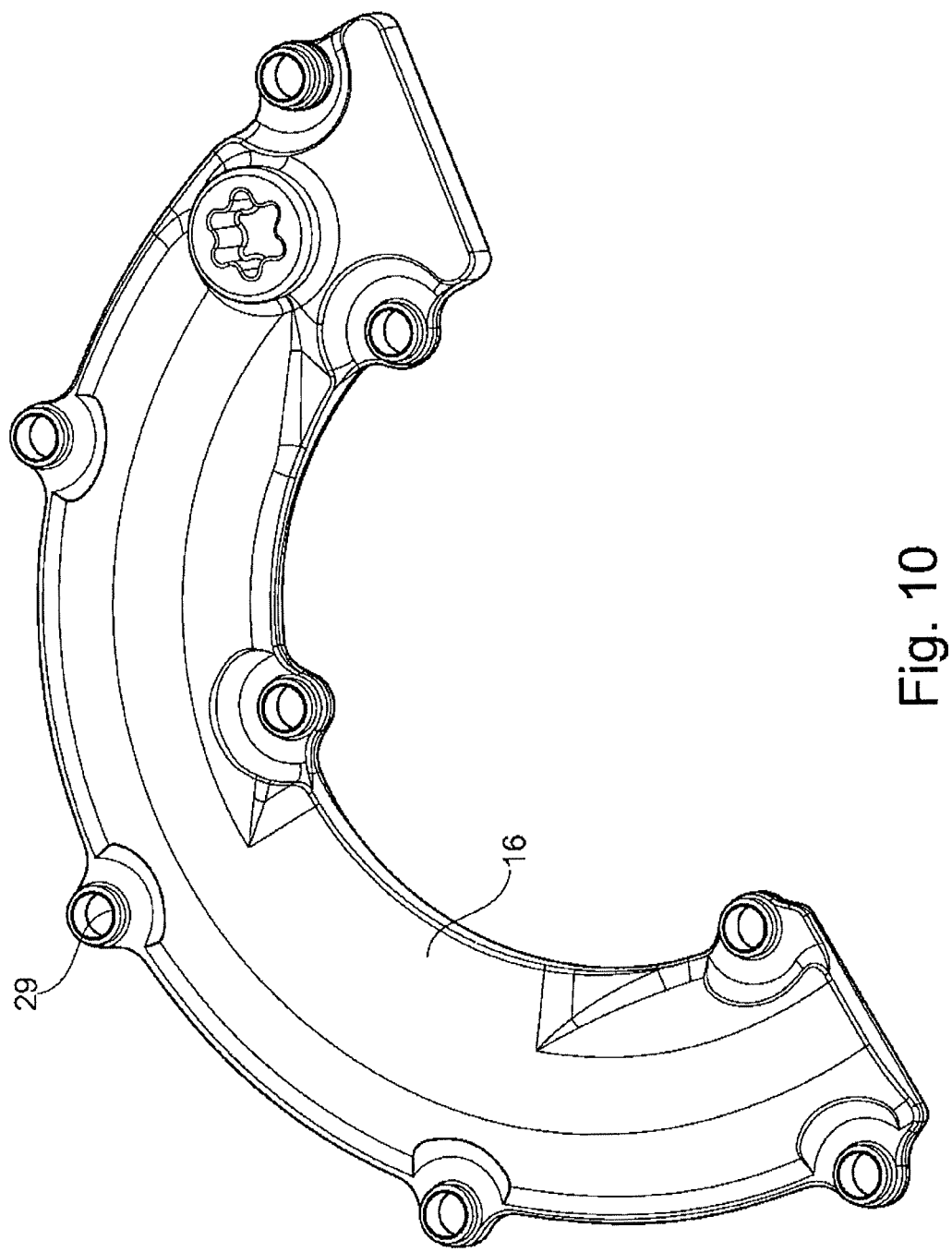
FIG. 10 a perspective view of the cover according to the disclosure.

In FIG. 10, cover 16 is depicted in a perspective view. The cover holes 29 are designed in such a way, that the connecting pins 21, which are attached on the pin mounting brackets 24 of housing 14, can reach through cover 16, by means of which a rivet connection 15 can be realized. The presented embodiment features eight cover holes 29 that are suitable for the rivet connection 15. Just like housing 14, cover 16 is made of aluminum/pressure die casting.

Figure 11:
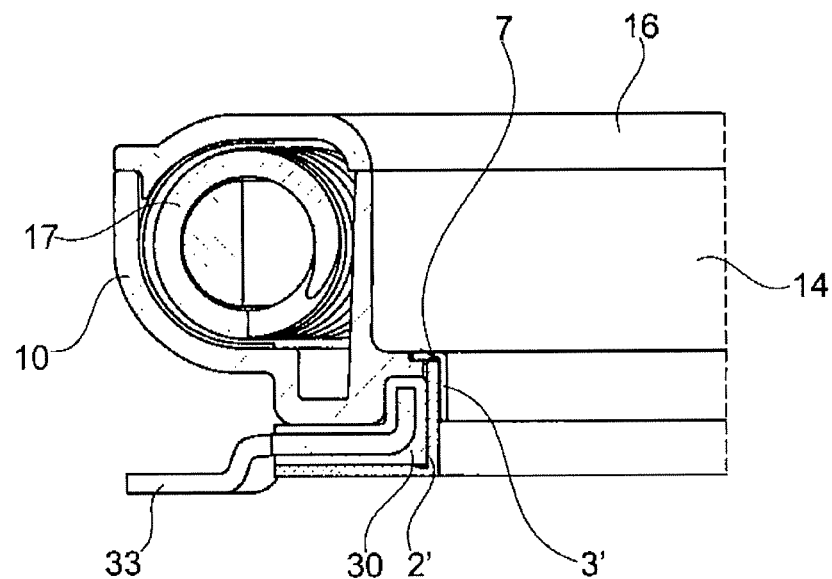
FIG. 11 a longitudinal section through a further embodiment of an interference fit assembly according to the disclosure.

FIG. 11 depicts a representation, in which the mounting of tensioning arm 10 is illustrated by means of a sliding shoe 30. This assumes the function of both the axial as well as the radial bearing. Sliding shoe 30 is positioned radially outside of bearing sleeve 2', which is arranged radially outside of locking sleeve 3'. FIG. 11 furthermore depicts bow spring 17, which is arranged inside of housing 14, which is closed by cover 16.

Figure 12:
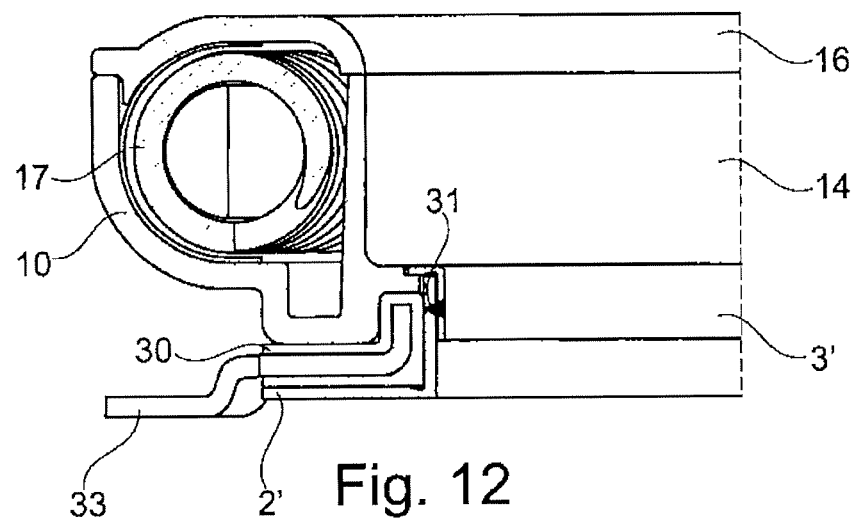
FIG. 12 a longitudinal section through yet another embodiment, which is differentiated from that of FIG. 11 by use of an interlocking between the bearing sleeve and the locking sleeve.

FIG. 12 depicts another embodiment. An additional interlocking 31 is formed first of all, like a fixing in place, between the bearing sleeve 2' and the locking sleeve 3'. The additional interlocking 31 extends both in axial as well as in radial direction.

Figure 13:
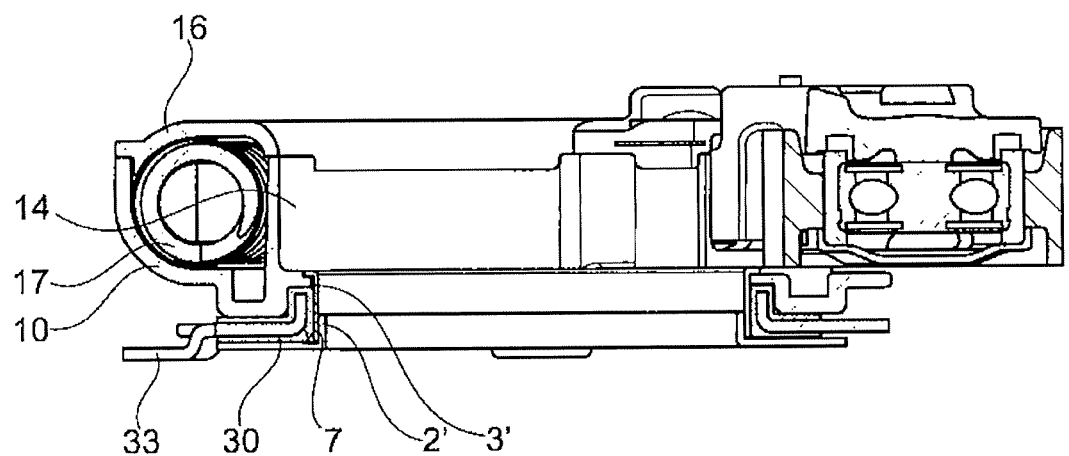
FIG. 13 a longitudinal section through another embodiment.

FIG. 13 depicts another embodiment. A locking sleeve, which is marked with the reference sign 3', is arranged on the radial outside of a bearing sleeve, which is marked with the reference sign 2'. The mounting of tensioning arm 10 is once more carried out by means of a sliding shoe 30. Otherwise the components are known from FIG. 13 and from FIG. 11.

In these embodiments of FIGS. 11, 12 and 13, tensioning arm 10 is mounted on a sliding bearing ring 33, which is attached along with the flange sections 8 to the generator housing (which is not depicted).

REFERENCE SIGN LIST

1 Pendulum tensioner
 2 Bearing sleeve
 3 Locking sleeve
 4 Sliding channel
 5 Locking wall
 6 Front face
 7 Axial play
 8 Flange section
 9 Flange hole
 10 Tensioning arm
 11 Axial bearing
 12 Axial and radial bearing
 13 Tensioning roller
 14 Housing
 15 Rivet connection
 16 Cover
 17 Bow spring
 18 Sleeves gap
 19 Second tensioning arm
 20 Second tensioning roller
 21 Connecting pin
 22 Bearing shell
 23 Securing wire
 24 Pin mounting bracket
 25a Relief groove
 25b Locking sleeve relief groove
 26 Axial bearing fixation
 27 Axial and radial bearing fixation
 28 Accommodating channel
 29 Cover holes
 30 Sliding shoe
 31 Additional interlocking
 32 Resting surface for assembling
 33 Sliding bearing ring

The invention claimed is:

1. A pendulum tensioner, comprising: a bearing sleeve configured to attach to a generator housing, wherein the bearing sleeve forms a sliding channel together with a locking sleeve, in which one or more tensioning arms of the pendulum tensioner is rotatably positioned with axial play, wherein the axial play is set by using the axial sleeve distance between the locking sleeve and the bearing sleeve, wherein the sleeve distance is greater than or equal to the axial play.

2. The pendulum tensioner of claim 1, wherein an interference fit assembly between the bearing sleeve and the locking sleeve is realized via a contact surface that extends in an axial direction and that the axial play can be adjusted using an axial motion of the bearing sleeve or of the locking sleeve.

3. The pendulum tensioner of claim 1, wherein an interference fit assembly is designed in such a way, that the locking sleeve is arranged radially within the bearing sleeve or that the locking sleeve is arranged radially outside of the bearing sleeve.

4. The pendulum tensioner of claim 1, wherein a bearing made up of two bearing components is arranged within a sliding channel configured to allow for a relative rotation between one of the tensioning arms and the sliding channel.

5. The pendulum tensioner of claim 4, wherein one bearing component is designed as an axial bearing and another bearing component as a combined axial and radial bearing.

6. The pendulum tensioner claim 5, wherein the axial hearing or the axial and radial bearing are designed as a sliding bearing.

7. The pendulum tensioner of claim 1, wherein the bearing sleeve is connected to the generator housing.

8. The pendulum tensioner of claim 1, wherein the bearing sleeve comprises several asymmetrically arranged mounting sections configured to connect the pendulum tensioner to a generator.

9. A pendulum tensioner, comprising:
 a first and second tensioning arm;
 a bearing sleeve configured to attach to a generator housing, wherein the bearing sleeve forms a sliding channel together with a locking sleeve, in which one of the tensioning arms is rotatably positioned with axial play, wherein the axial play is set by using an axial sleeve distance between a locking sleeve and the bearing sleeve, wherein the sleeve distance is greater than or equal to the axial play.

10. The pendulum tensioner of claim 9, wherein an interference fit assembly between the bearing sleeve and the locking sleeve is realized via a contact surface that extends in axial direction.

11. The pendulum tensioner of claim 9, wherein the axial play can be adjusted by an axial motion of the bearing sleeve.

12. The pendulum tensioner of claim 9, wherein the axial play can be adjusted by an axial motion of the locking sleeve.

13. The pendulum tensioner of claim 9, wherein the locking sleeve is arranged radially within the bearing sleeve, or that the locking sleeve is arranged radially outside of the bearing sleeve.

14. The pendulum tensioner of claim 9, wherein the locking sleeve is arranged radially outside of the bearing sleeve.

15. The pendulum tensioner of claim 9, wherein the tensioner includes an axial bearing that is a sliding bearing.

16. The pendulum tensioner of claim 9, wherein the bearing sleeve is directly connected to the generator housing.

17. A pendulum tensioner, comprising:
 a bearing sleeve configured to attach to a generator housing, wherein the bearing sleeve forms a sliding channel together with a locking sleeve; and
 a plurality of tensioning arms configured to be adjusted with axial play, wherein the axial play is set by using an axial sleeve distance between a locking sleeve and the bearing sleeve, wherein the sleeve distance is greater than or equal to the axial play.

18. The pendulum tensioner of claim 17, wherein a bearing arranged within the sliding channel is configured to distribute tensions in a circumferential direction.

* * * * *